Feb. 19, 1963  H. PACKARD  3,077,760
SELF-TESTING GYROSCOPE
Filed Nov. 18, 1960  2 Sheets-Sheet 1

INVENTOR.
Henry Packard
BY Kenway, Jenney & Hildreth 3,077,760
Patented Feb. 19, 1963

3,077,760
SELF-TESTING GYROSCOPE
Henry Packard, Norwood, Mass., assignor to Northrop Corporation, Beverly Hills, Calif., a corporation of California
Filed Nov. 18, 1960, Ser. No. 70,348
5 Claims. (Cl. 73—1)

My invention relates to gyroscopes, and particularly to an improved gyroscope incorporating means for testing its operation and accuracy without disconnecting it from other apparatus with which it may be associated.

Modern navigation and guidance systems are compact and intricate arrangements of many components which are mechanically and electrically interconnected. One of the more important components of such systems is the gyroscope, of which several may be used to detect the attitude and state of motion of the vehicle in which they are mounted. Since the function of a gyroscope in such a system is not performed until the vehicle is in motion, a locked gimbal or other malfunction may not be apparent until it is too late to make repairs. Accordingly, it would be highly desirable to be able to test the performance of each of the gyroscopes in a navigation or guidance system before putting the system into operation.

Prior to my invention, inspection of a gyroscope would have necessitated either physically removing it from the system in which it was employed, or electrically disconnecting it. In accordance with my invention, a gyroscopic construction is provided in which means are incorporated for testing the gyroscope without disconnecting it either electrically or mechanically, and without interfering in any way with its function. Moreover, a self-testing gyroscope in accordance with my invention requires only two additional electrical leads to be brought out of the gyroscope to perform the functions of measuring the speed of the rotor of the gyroscope and rotating it about its output axis to measure its deflection in response to a predetermined deflecting signal.

Briefly, a self-testing gyroscope in accordance with my invention comprises a conventional gyroscope to which has been added a pair of coils disposed on opposite sides of the rotor of the gyroscope and having a common electrical axis displaced by a small angle from the input axis of the gyroscope. A plurality of magnets are disposed about the periphery of the rotor of the gyroscope, with their poles aligned radially of the rotor and having a common orientation such that they induce a voltage in the externally mounted coils during rotation of the rotor. By measuring either the frequency or the magnitude of the voltage so induced, the speed of the gyroscope can be measured. In addition, I have found that by applying direct current voltage to the coils, the gyroscope may be made to rotate about the output axis by an amount, proportional to the current in the coils, which can be observed and compared with the deflection of a normally operating gyroscope to determine whether or not the gyroscope will precess normally in operation.

The structure and operation of the gyroscope of my invention, and the method of employing it to indicate its state of operation, will best be understood by reference to the accompanying drawings, together with the following detailed description of a preferred embodiment thereof.

Figure 1:
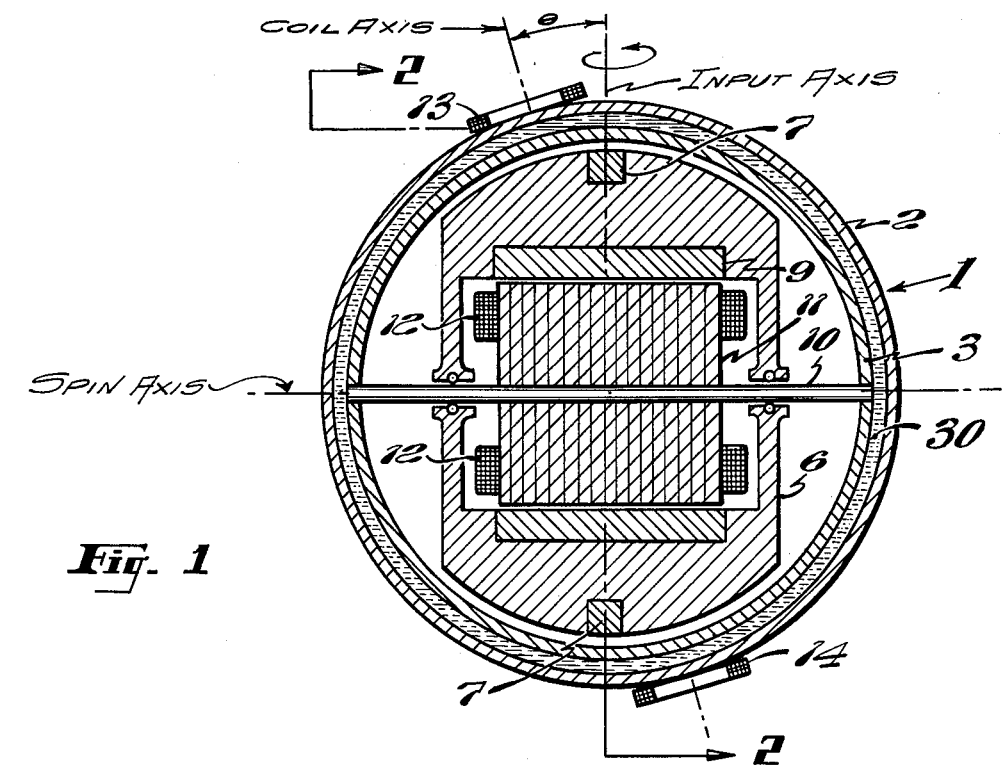
FIGURE 1 is a cross-sectional view of a gyroscope in accordance with my invention.
Figure 2:
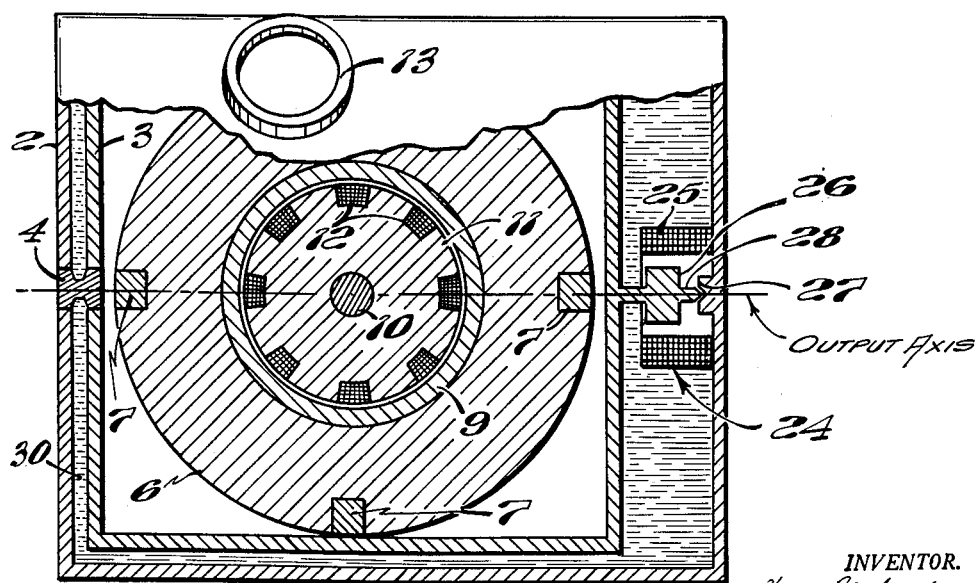
FIGURE 2 is an elevational view, partly in cross section, of the gyroscope of FIG. 1, taken essentially along the line 2—2 in FIG. 1.

Referring now to FIGURES 1 and 2, I have shown a gyroscope generally designated as 1, having an outer casing 2 and an inner casing, or gimbal 3, disposed within the outer casing with a clearance which has been greatly exaggerated in the drawing for purposes of illustration. The gimbal 3 is mounted in the outer casing for rotation about the output axis indicated in FIG. 2, by conventional means comprising a torsion bar 4 secured between the inner and outer casings at one end as schematically indicated in FIG. 2, and a jewel bearing schematically indicated as comprising a pivot 23 attached to the gimbal 3 and a jewel support 27 attached to the outer casing 2. In a manner which is also conventional, a signal generator 24, comprising ferromagnetic teeth 26 formed on the pivot 28 and annular pick-off coils 25 mounted on the casing 2, is provided to generate a signal proportional to the angular position of the gimbal 3 with respect to the outer casing 2. The space between the gimbal and the outer casing is filled by a suitable fluid 30, in a conventional manner.

As best shown in FIG. 1, the gyroscope comprises a shaft 10 mounted transversely in the gimbal 3 and having affixed thereon a stator 11 carrying windings 12. A rotor 6 is rotatably mounted on the shaft 10. The rotor is made of a non-magnetic metal, and carries a ferromagnetic hysteresis ring 9 affixed thereto, whereby the rotor can be rotated by the energization of the windings 12 in a conventional manner.

The structure which has thus far been described is that of a conventional gyroscope, and since this construction is well known in the art, it has not been shown in proportion or in detail, but only to a sufficient extent to illustrate the cooperation of the elements of the gyroscope with the additional structure required in the practice of my invention.

Figure 3:
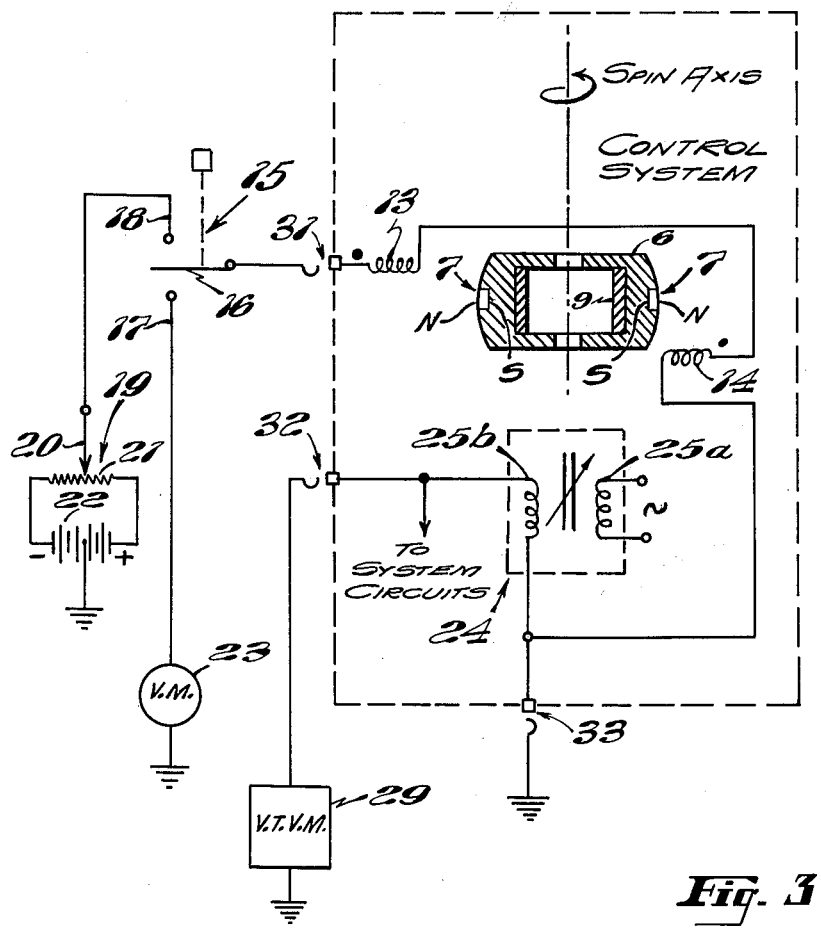
FIGURE 3 is a schematic wiring diagram of a test circuit adapted to be employed with the gyroscope shown in FIGURES 1 and 2.

A plurality of magnets 7 are disposed in the periphery of the rotor 6 as shown, each magnet being oriented with like poles directed toward the center of the rotor. For example, as shown in FIG. 3, the south poles may be directed inward, and the north poles directed outward, although the opposite configuration is equally suitable. While I have shown four such magnets, it will be apparent that more or less could be used if desired, without departing from the scope of my invention.

As best shown in FIG. 1, a pair of coils 13 and 14 are affixed to the outside of the casing 2, and are so arranged that their common electromagnetic axis is displaced from the input axis of the gyroscope by an angle $\theta$. As will appear, this angle is not particularly critical.

In FIG. 3, I have shown the electrical circuits employed with the structure of FIGS. 1 and 2. As indicated, the gyroscope 1 is understood to be connected in a control system, indicated by the dotted line, and external connections are made to the system by conventional means such as the connectors 31, 32 and 33.

Referring now to FIG. 3, in conjunction with FIGS. 1 and 2, the coils 13 and 14 are connected in series-aiding relationship, and are so disposed that when energized with direct current, they present like poles to the rotor 6. For simplicity, these connections have not been shown in FIG. 1.

As shown in FIG. 3, the circuit of the signal generator 24 comprises an exciting winding 25a energized from a suitable source of current such as a conventional 400 cycle generator, not shown, and a pick-off winding 25b. The variable coupling indicated represents the effect of the angular position of the teeth 26 (FIG. 2) with respect to the windings 25a and 25b. By this construction, it will be apparent that a voltage having a magnitude proportional to the rotational deflection of the gimbal 3 with respect to outer casing 2 will appear across the winding 25b.

The coils 13 and 14 are connected in a circuit which extends from ground through the coils in a series and through connector 31 to the armature 15 of a switch 16. This switch can be actuated to engage the armature 15 with either of contacts 17 and 18. With contact 18 engaged, the coils are connected to a D.C. torquing circuit which extends from the contact 18 to the manually adjustable wiper 20 of a potentiometer 19. The potentiometer comprises a resistor 21 connected across the opposite terminals of a center-tapped battery 22, such that either a positive or a negative torquing voltage can be applied to the coils 13 and 14.

With the contact 17 engaged, the coils 13 and 14 are connected to a conventional A.C. voltmeter 23, which will indicate the magnitude of the voltage induced in the coils by the rotation of the magnets 7 with the rotor 6. Alternatively, a frequency meter or an oscilloscope could be employed in place of the voltmeter 23 is so desired, without departing from the scope of my invention.

A vacuum-tube voltmeter 29 is connected across the output winding 25b of the signal generator 24, to indicate by its deflection the rotational deflection of the gyroscope about its output axis.

The reference, or ground, connections shown in the drawings can be established in any suitable conventional manner, and for example, can be established by connections to the gyroscope casing or to the frame of the structure in which the gyroscope is mounted. Connections to the external test apparatus and to the external ground from the signal generator 24 and from the coils 13 and 14 may be made by detachable connectors 31, 32 and 33, and these are the only external connections which would need to be made to the system in which the gyroscope is employed.

In use, when it is desired to test the operation of the gyroscope, the switch 15 is first actuated to engage the armature 16 with the contact 17. If the rotor is operating at the proper speed, the magnets 7 will induce a voltage in the coils 13 and 14 of a magnitude which can be observed on the voltmeter 23. Since the frequency of the signal is also proportional to the angular velocity of the rotor, a similar measurement can be made by using a frequency meter, or the wave length may be measured with an oscilloscope.

After determining that the gyroscope is operating at a proper speed, and is free to turn, the switch 15 is actuated to engage the armature 16 with the contact 18, and the wiper 20 is operated in one direction or the other to supply a D.C. voltage to the coils 13 and 14. Assuming that the induced field provides south poles facing the north poles of the magnets 7, the gimbal and the rotor will be rotationally deflected clockwise in the plane of FIG. 3 about the rotational output axis of the gyroscope. This rotation will cause a voltage to be generated by the signal generator 24, which can be observed by means of the vacuum-tube voltmeter 29. The magnitude of this voltage will indicate whether the deflection is of the proper amount with respect to the voltage applied by the potentiometer 19. An opposite deflection may be observed by adjusting the wiper 20 to produce a voltage of the opposite polarity. Operation opposite to that described above takes place, and the coils present north poles to the north poles of the magnets 7, repelling the magnets to cause a counter-clockwise rotation of the rotor in the plane of FIG. 3.

If desired, switch 15 in FIG. 3 can be omitted, by inserting a capacitor in series with voltmeter 23 and connecting contacts 18 and 19 together and to the heel of armature 16. By this arrangement, all of the relevant observations can be made simultaneously.

While I have described only one embodiment of my invention in detail, many changes and variations will be apparent to those skilled in the art upon reading my description, and such can obviously be made without departing from the scope of my invention.

Having thus described my invention, what I claim is:

1. In a gyroscope having a rotor adapted to spin about a first axis and having an input axis normal to said spin axis and an output axis normal to said spin axis and said input axis, a plurality of magnets mounted in the periphery of the rotor, said magnets having like poles directed toward the center of the rotor, and a pair of coils connected in series relationship disposed on opposite sides of the rotor and having a common electromagnetic axis oblique to the plane containing the output axis and the input axis of the gyroscope.

2. Apparatus for testing the operation of a gyroscope having a rotor disposed within a housing, comprising, in combination, a plurality of magnets disposed on the periphery of the rotor and having like poles directed toward the center of the rotor, a pair of coils connected in series-aiding relationship disposed on opposite sides of the rotor and oriented to displace the gyroscope about its output axis when energized with a direct current, means controlled by the operating voltage induced in the coils by the magnets upon rotation of the rotor for measuring the speed of rotation of the rotor, means for supplying direct current to the coils for deflecting the gyroscope about its output axis, and means for observing the deflection of the gyroscope in response to the applied direct current.

3. A testing system for a gyroscope having a rotor arranged for rotation about a first axis and for precession about a second axis, comprising, in combination, a coil mounted on the gyroscope and having an electromagnetic axis in skewed relation to the plane containing both said first axis and said second axis, a magnet mounted on said rotor and oriented to induce an alternating voltage in said coil during rotation of said rotor, means responsive to said alternating voltage for indicating the speed of rotation of said rotor, means for applying a unidirectional voltage to said coil for deflecting said rotor about its second axis, and means responsive to deflection of said rotor about its second axis for indicating the extent of said deflection.

4. In combination with a gyroscope having a rotor adapted to rotate about a first axis and to precess about a second axis, first electromagnetic means mounted on the gyroscope, second electromagnetic means mounted on said rotor, said first and second electromagnetic means being disposed in cooperative inductive relationship and responsive to the angular velocity of the rotor about its first axis to produce an output signal in accordance therewith, and means for energizing said first electromagnetic means with a direct current to rotate said rotor about said second axis.

5. In combination with a gyroscope having a rotor adapted to rotate about a first axis and to precess about a second axis in response to rotation about a third axis, a coil mounted on the gyroscope and having an electromagnetic axis inclined at an oblique angle to the plane containing said second axis and said third axis, said first, second, third and electromagnetic axes intersecting at a common point, magnets mounted on said rotor and inducing an alternating voltage, having a frequency and magnitude determined by the angular velocity of said rotor about said first axis, in said coil, and means for applying a direct current to said coil to rotate said rotor about said second axis.

References Cited in the file of this patent
UNITED STATES PATENTS

| | | |
|---|---|---|
| 2,852,940 | Seymour-Lee | Sept. 23, 1958 |
| 2,864,255 | Stern et al. | Dec. 16, 1958 |